United States Patent [19]
Burks et al.

[11] Patent Number: 5,748,321
[45] Date of Patent: May 5, 1998

[54] POSITION AND ORIENTATION TRACKING SYSTEM

[75] Inventors: Barry L. Burks, Oak Ridge; Fred W. DePiero, Knoxville; Gary A. Armstrong, Oak Ridge; John F. Jansen, Knoxville; Richard C. Muller, Oak Ridge; Timothy F. Gee, Riceville, all of Tenn.

[73] Assignee: The United States of America as represented by the Department of Energy, Washington, D.C.

[21] Appl. No.: 646,187

[22] Filed: May 7, 1996

[51] Int. Cl.$^6$ .................................................. G01B 11/10
[52] U.S. Cl. ...................... 356/386; 356/387; 356/222; 356/226
[58] Field of Search ............................ 356/386, 387, 356/376, 222, 226

[56] References Cited

U.S. PATENT DOCUMENTS

| | | |
|---|---|---|
| 4,588,297 | 5/1986 | Inazaki et al. |
| 4,877,325 | 10/1989 | Weule et al. |
| 4,912,643 | 3/1990 | Beirxe ........................ 356/1 X |
| 5,073,819 | 12/1991 | Gates et al. .................. 356/397 |
| 5,110,202 | 5/1992 | Dornbusch et al. ........... 356/1 X |
| 5,175,595 | 12/1992 | Fukase ........................ 356/387 |

*Primary Examiner*—Frank G. Font
*Assistant Examiner*—Reginald A. Ratliff
*Attorney, Agent, or Firm*—Kathy Lovingood; Stephen B. Hamel; William R. Moser

[57] ABSTRACT

A position and orientation tracking system presents a laser scanning apparatus having two measurement pods, a control station, and a detector array. The measurement pods can be mounted in the dome of a radioactive waste storage silo. Each measurement pod includes dual orthogonal laser scanner subsystems. The first laser scanner subsystem is oriented to emit a first line laser in the pan direction. The second laser scanner is oriented to emit a second line laser in the tilt direction. Both emitted line lasers scan planes across the radioactive waste surface to encounter the detector array mounted on a target robotic vehicle. The angles of incidence of the planes with the detector array are recorded by the control station. Combining measurements describing each of the four planes provides data for a closed form solution of the algebraic transform describing the position and orientation of the target robotic vehicle.

23 Claims, 11 Drawing Sheets

SPECIFIC VECTORS FOR ONE LASER

POSITION AND ORIENTATION TRACKING SYSTEM

FIELD OF THE INVENTION

The invention relates generally to tracking systems, and more particularly, to systems for tracking the position and orientation of a moving object.

BACKGROUND OF THE INVENTION

A variety of remotely controlled mechanisms for performing work have been developed. Robots have been developed for use in highly toxic environments, where even minor toxic exposure is fatal. Nuclear waste sites, for example, are highly toxic environments in which humans cannot work. Often, work at nuclear waste sites cannot be done without danger to an individual worker. Robots are also used where the likelihood of grave bodily injury cannot be minimized, such as on an assembly line or in a heavily mechanized area.

It is difficult to monitor the position and orientation of moving robots and other objects. Radioactive waste silos often present extended distances, heavy payloads, and unstable surfaces. These conditions prevent conventional measuring transducers from accurately reporting the position and orientation of a target object within a radioactive waste silo.

U.S. Pat. No. 5,110,202 to Dornbusch, et al. describes a spacial positioning and measurement system. The system utilizes fixed reference station systems and portable position sensor systems to provide a three-dimensional position measurement of an object. More specifically, the system includes at least three fixed referent stations and one or more portable position sensor systems. Each referent station includes a reflective surface and produces a primary laser beam which rotates at a constant angular velocity. When the primary laser beam rotates to strike the reflective surface, a secondary laser beam is created which rotates in an opposite direction to the primary beam. For any point on the one or more portable sensor systems which is crossed by the primary and secondary laser beams, a horizontal angle can be determined from the time difference between the time of crossing of the primary and secondary laser beams. If the horizontal angles are known for three fixed stations, the point of intersection of three planes, and thus the three-dimensional position of the point can be determined. A shortcoming of this approach is its limited range of measurement and accuracy.

Accurately determining the position and orientation of robotic manipulators and remotely operated work vehicles continues to be a challenge in this field; and, a need exists for high-precision long-range measurements of the position and orientation of a moving object.

SUMMARY OF THE INVENTION

An advance in the art of positioning and tracking measurement is provided by the present invention. An illustrative embodiment of the present invention provides for accurately measuring the position and orientation of a moving target object and for accurately tracking a variety of target objects moving within a wide monitoring area. A laser scanning apparatus operates scanning lasers to scan a moving target. A detector array coupled to the moving target is capable of distinguishing transmitted laser signals. A control station correlates data from the laser scanning apparatus and the detector array to accurately measure the position and orientation of the target object to which the detector array is coupled.

Other objects, advantages, and salient features of the invention will become apparent from the following detailed description, in conjunction with the annexed drawings, which discloses a preferred embodiment of the present invention.

DETAILED DESCRIPTION OF THE PREFERRED EMBODIMENT

Figure 1:
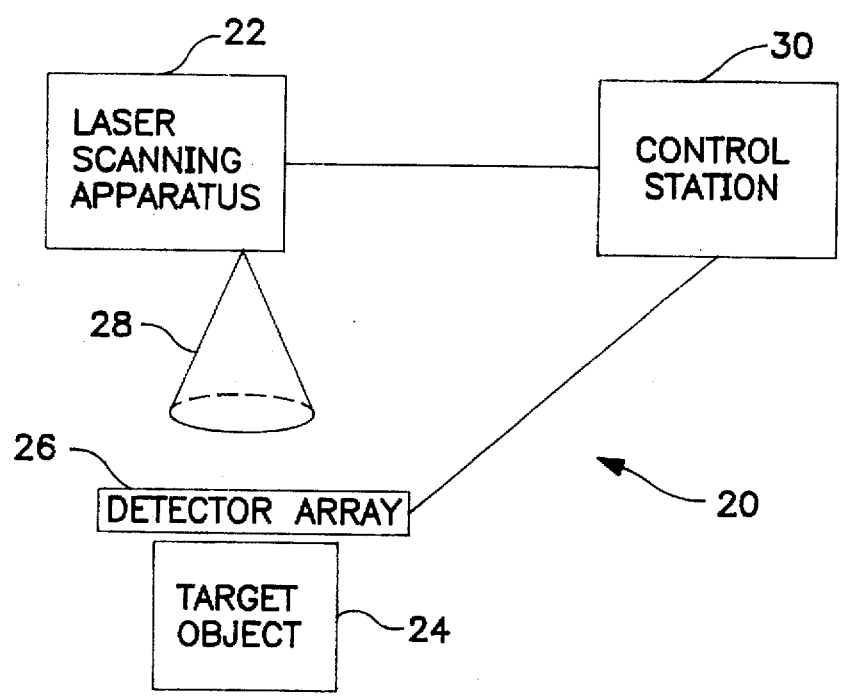
FIG. 1 is a schematic view of a position and orientation tracking system according to the principles of the invention.

The present invention is directed to a position and orientation system for tracking a moving target object. Referring to FIG. 1, the position and orientation tracking system 20 includes a laser scanning apparatus 22 for scanning the moving target object 24, a detector array 26 coupled to the moving target object 24 capable of receiving and distinguishing scanning lasers 28 from the laser scanning apparatus 22, and a control station 30 which controls the laser scanning apparatus 22 and the detector array 26. The control station 30 is operable to determine the position of the moving target object 24 based on data provided by the laser scanning apparatus 22 and the detector array 26.

Figure 2:
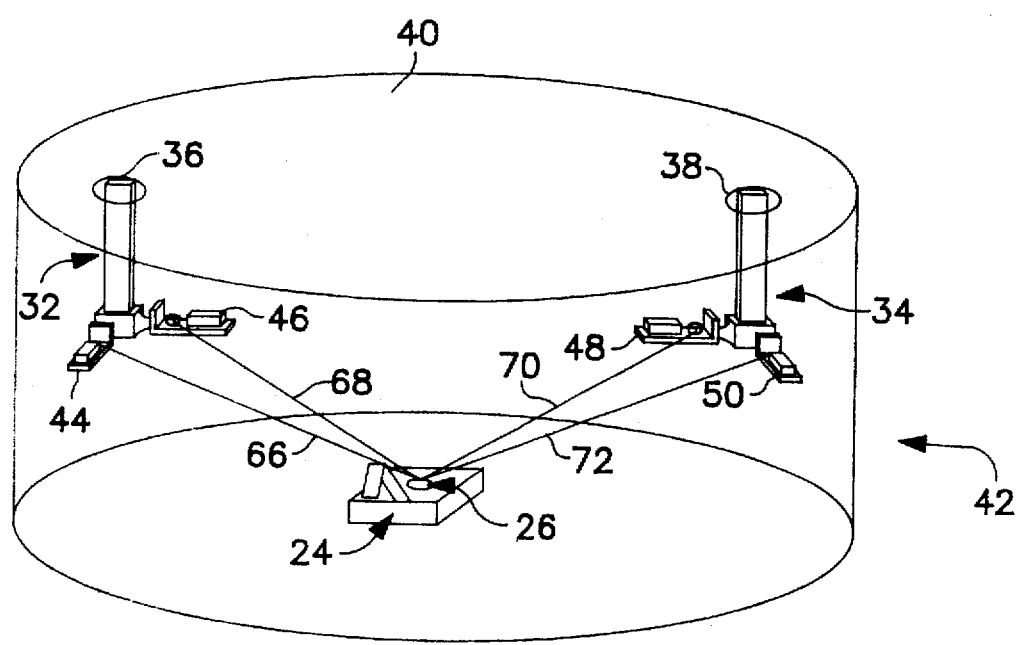
FIG. 2 is a perspective view of the position and orientation tracking system according to an embodiment of the invention.

The laser scanning apparatus 22 (depicted schematically in FIG. 1) includes a first measurement pod 32 which is operable to scan the target object 24 and a second measurement pod 34 which is operable to scan the target object 24, as shown in FIG. 2. The first measurement pod 32 and the second measurement pod 34 are each mounted in a circular access port 36, 38 (e.g., twenty-six inches in diameter) of the dome 40 of a radioactive waste storage silo 42. Each measurement pod 32, 34 comprises two laser scanner subsystems 44, 46, 48, 50. In the preferred embodiment, the target object 26 is a robotic vehicle with an articulatable robotic arm designed to be moved within the storage silo 42.

Figure 3:
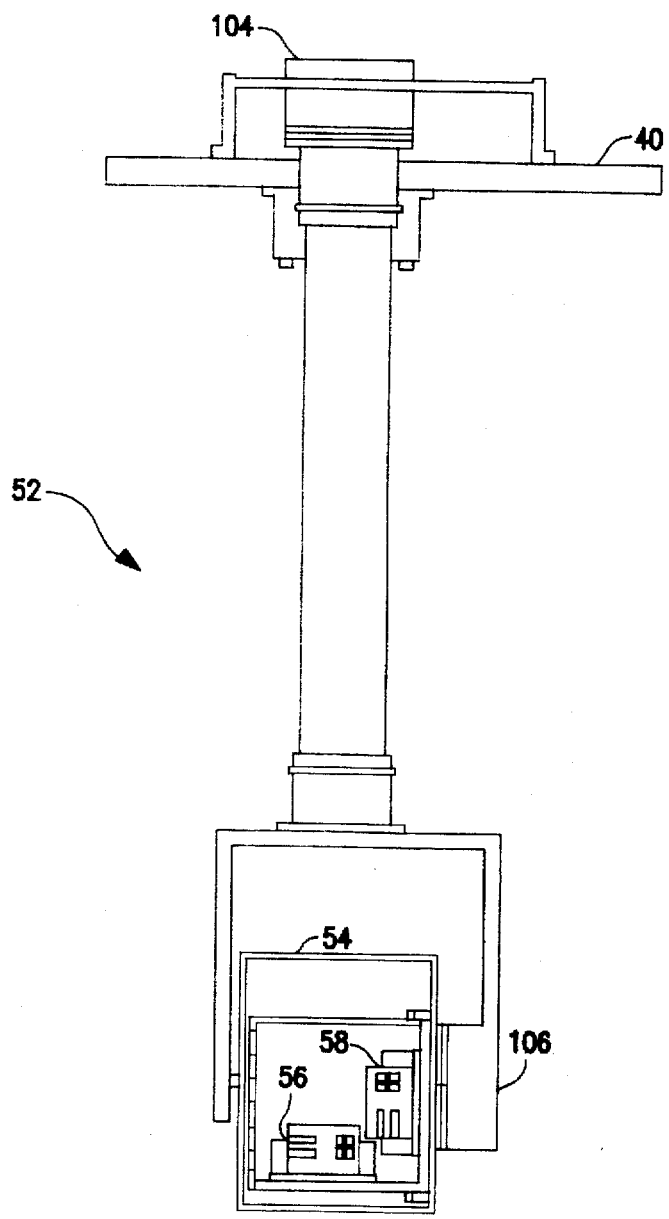
FIG. 3 is an elevational view of a measurement pod of the position and orientation tracking system depicted in FIG. 2.
Figure 4:
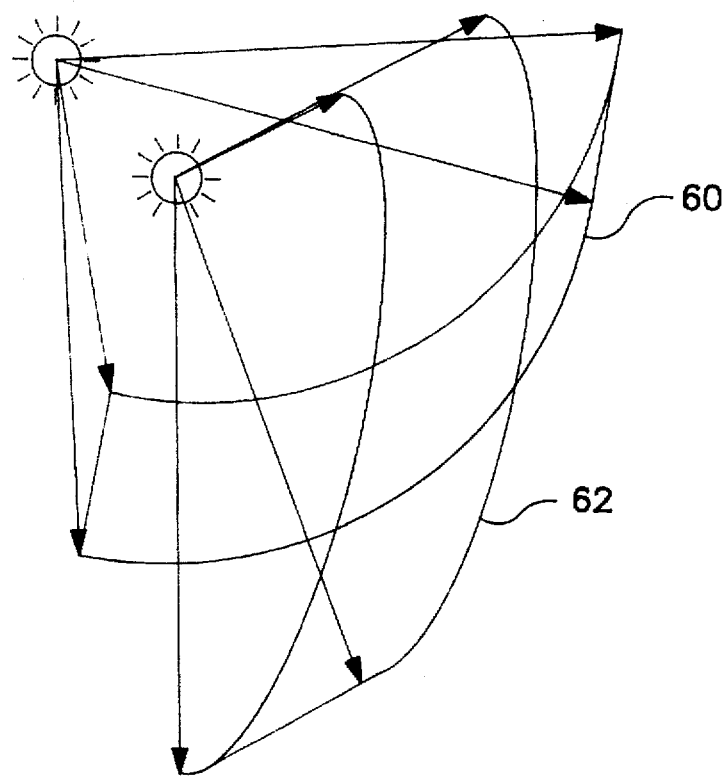
FIG. 4 is a perspective view for describing operation of the measurement pod depicted in FIG. 3.
Figure 5:
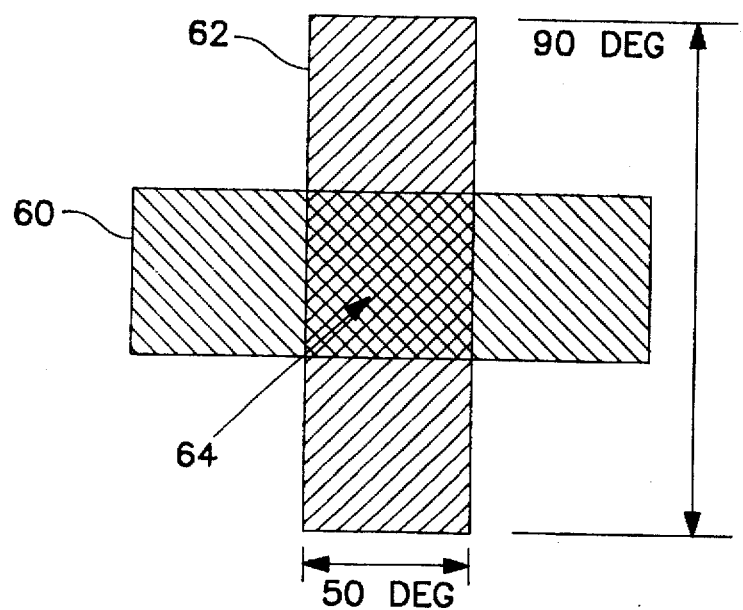
FIG. 5 is a schematic view of a valid sensing region created by operation of the measurement pod depicted in FIG. 4.

Referring to FIG. 3, each measurement pod 52 suspended from the dome 40 of the silo 42 comprises an articulatable box 54. The first and second laser scanner subsystems 56, 58 are rigidly mounted inside the box 54. Each laser scanner subsystem 56, 58 includes (a) a spot laser source with optical circuitry on its front end to generate a 50° full angle line laser and (b) a multi-faceted rotating mirror which scans the 50° full angle line laser through a ±45° sweep to generate laser planes 60, 62 as shown in FIGS. 4 and 5. The line lasers emitted by the two laser scanner subsystems 56, 58 in the box 54 are relatively orthogonal. The box 54 is controllably articulatable to scan ±180° in a pan direction, and is controllably articulatable to scan ±180° in a tilt direction.

In operation, (i) the first and second laser scanner subsystems 56, 58 within the box 54 (which is capable of panning and tilting) generate laser planes 60, 62 (FIG. 4) that scan the radioactive waste surface within the silo 42, and (ii) the box 54 articulates (pans and tilts) to keep the target object 24 within a valid sensing region 64 (FIG. 5) defined by the intersection of the laser planes 60, 62.

Figures 6, 7:
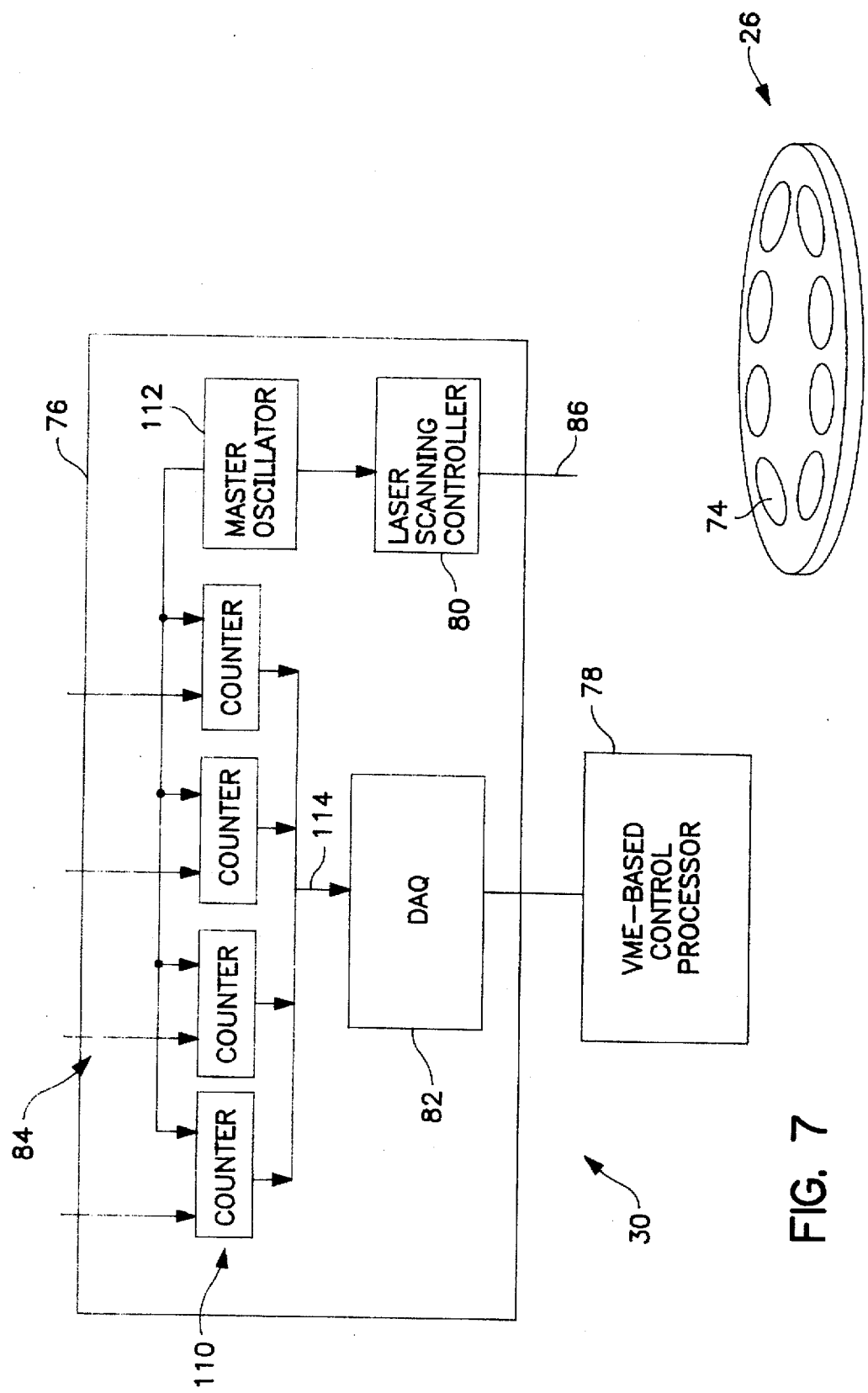
FIG. 6 is a perspective view of a detector array according to an embodiment of the invention.
FIG. 7 is a schematic view of a control station according to an embodiment of the invention.

The detector array 26 (FIG. 1) mounted on the target object 24 is preferably a ring-shaped array of detector modules, as shown in FIG. 6. The detector array 26 detects scanning of the target object 24 by scanning laser planes 66, 68, 70, 72 (FIG. 2). In the preferred embodiment of the invention, eight laser detector modules are fabricated into the ring-shaped array 26.

The ring-shaped array 26 generates detection signals responsive to detected laser scanning. A given detection signal identifies a particular detector module (e.g., 74) of the array 26 and also identifies the impinging laser and its laser scanner subsystem source. Each detection signal is transmitted to the control station 30 (FIG. 1).

Referring to FIG. 7, the control station 30 comprises a digital controller 76 and a VME-based control processor 78 (which can be a computer). The digital controller 76 includes a laser scanning controller 80 to control the laser scanning apparatus 22. The digital controller 76 switches the spot-laser source and synchronizes the rotating mirror using the laser scanning controller 80. A data acquisition system (DAQ) 82 receives counts of detection signals 84 from the detector array 26. The DAQ 82 is coupled to the control processor 78 and passes time-stamped sensor hit information to the control processor. The control processor 78 converts this time-stamped information into incident angles and then to position and orientation information about the target object.

The control station 30 monitors the laser scanning apparatus 22 and the detector array 26. The detection signals 84 generated by the detector array 26 in response to impinging scanning laser planes 28 (FIG. 1) are processed by the control station 30 to determine the angles of incidence of the identified scanning lasers from (a) the laser scanning apparatus 22 to (b) the detector array 26 mounted on the moving target 24 in order to determine the location and orientation of the moving target object 24.

The laser scanning controller 80 (FIG. 7) controls the high-precision panning and tilting of the box 54 (FIG. 3). This is necessary to position the laser planes so as to have the ring-shaped detector array 26 (FIG. 6) on the moving target object 24 (FIG. 1) centered therein.

The control station 30 (FIG. 1) is coupled for communicating with each measurement pod 32, 34 (FIG. 2) of the laser scanning apparatus 22 and with the detector array 26 mounted on the target object 24 to determine the direction and position of the moving target object 24 within the target range. Each measurement pod transmits direction information 86 to the digital controller 76 (FIG. 7) for determining the pan directional orientation and the tilt directional orientation of the box 54 (FIG. 3) to the detector array 26 on the target object 24.

The detector array 26 is able to register a scanning hit on the moving target emitted by operation of the four laser scanner subsystems 44, 46, 48, 50. The detector array 26 (FIG. 6) is operable to determine: (a) which detector modules of the array sensed hits; and, (b) which laser scanner subsystems scored each respective hit. The detector array 26 generates a series of detection signals 84 containing this information in response to scanning hits. The detection signals 84 are transmitted to the control station 30. The control station 30 (FIG. 7) calculates the position and orientation of the target object based on the direction information 86 provided by the laser scanning apparatus and based on detection signals 84 transmitted by the detector array.

Figure 8:
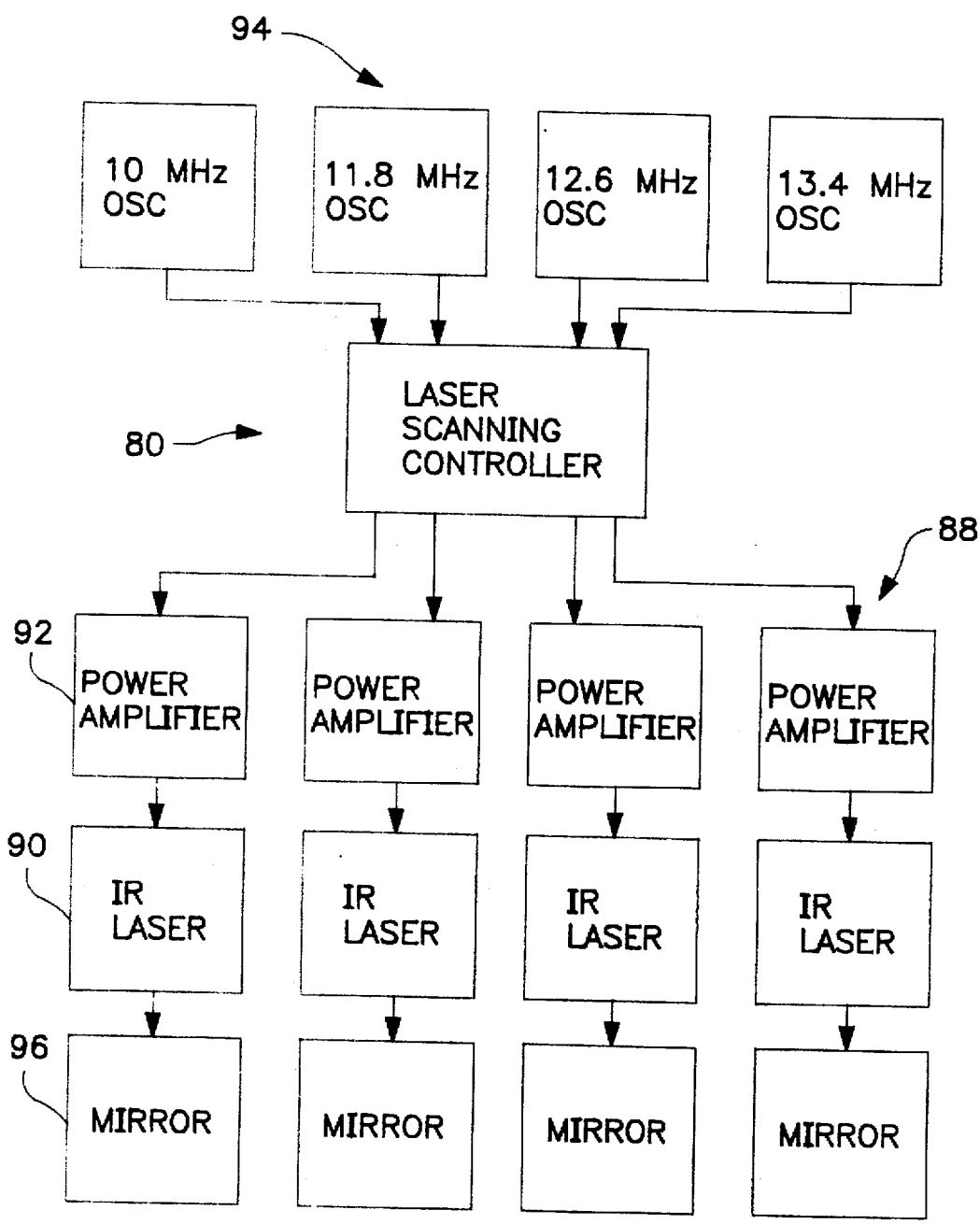
FIG. 8 is a schematic view of a laser controller in the control station depicted in FIG. 7 coupled to laser scanner subsystems according to an embodiment of the invention.

Referring to FIG. 8, the laser scanning controller 80 is coupled to the laser scanner subsystems 88. Each laser scanner subsystem comprises an infrared (IR) laser source 90 and a power amplifier 92 for driving the IR laser sources. The laser controller 80 is coupled to four oscillators 94, which are tuned to 10 MHz, 11.8 MHz, 12.6 MHz, and 13.4 MHz, for amplitude modulation purposes. In the preferred embodiment, the IR laser source 90 is a semiconductor laser diode with an approximate power output of 30 milliwatts and emits at a wavelength in an approximate range of 810–820 nanometers. The semiconductor spot laser has line generating optics in its front end that convert the spot into a line. The line has a full angle of 50° and a maximum divergence of 1 milliradian. Multi-faceted polygonal rotating mirrors 96 with very stable angular velocities sweep the line lasers through the laser planes 60, 62 depicted in FIGS. 4 and 5.

Each of the four infrared laser planes generated by operation of the four laser diode sources 90 is amplitude modulated at a different modulating frequency with the four respective oscillators 94. Using different modulation frequencies with each of the four laser planes allows the detector array 26 to discriminate the laser planes causing the scored hit at a detector module 74 (FIG. 6) of the array 26 by filtering and demodulating using analog sensor processing electronics. The detector array 26 is embodied as a standard cell VLSI application specific integrated circuit (ASIC).

Figure 9:
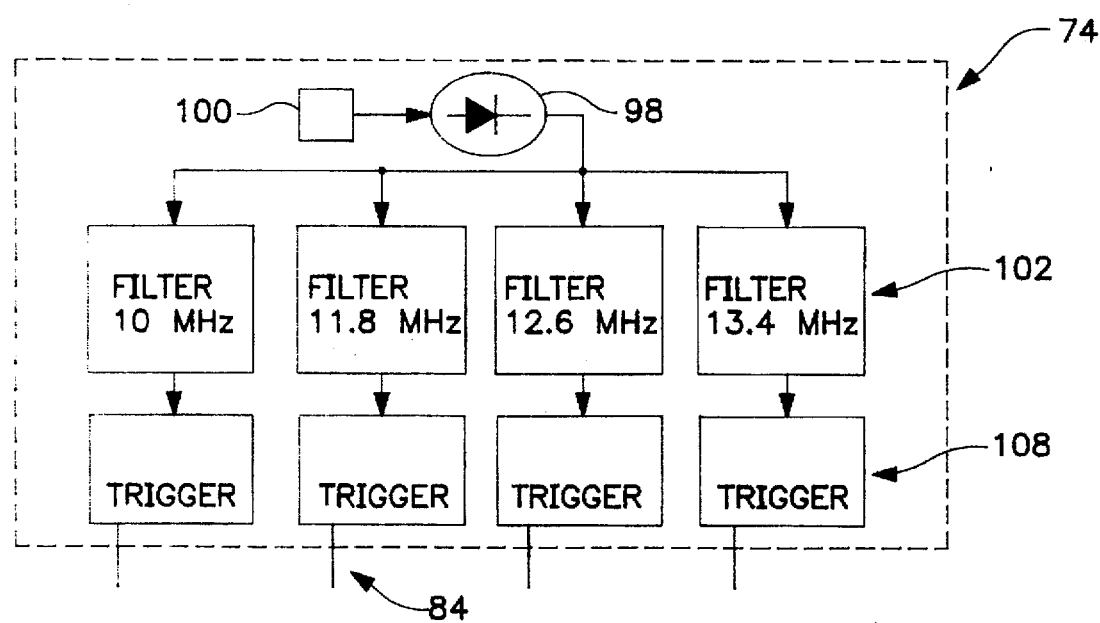
FIG. 9 is a schematic view of a module of the detector array depicted in FIG. 6.

Referring to FIG. 9, each of the detector modules 74 of the array 26 comprises an optical IR sensor 98. Each optical IR sensor 98 is coupled to a front-end infrared filter 100 to discriminate valid scanning laser signals from spurious environmental noise. The front-end filter 100 separates ambient light (emitted by the sun, incandescent lights, or fluorescent lights) from the range of infrared scanning laser radiation emitted by the laser scanner subsystems 44, 46, 48, 50 (FIG. 2). The front-end optical filters 100 have a bandwidth of about 10 to 20 nanometers. The front-end filters prevent an ambient spurious light source from causing a hit to be registered in the detector array 26. The output of each optical IR sensor 98 is coupled to a bank of amplifiers and bandpass filters 102 which perform a demodulation operation. Each bandpass filter in the bank 102 requires approximately one period to qualify a hit in one of the four modulating frequency bands, adding about 1.0 microsecond to the latency of the system.

As each of the dual orthogonal laser scanner subsystems 44, 46 and 48, 50 sweeps through its cycle, the laser planes 60, 62 emitted therefrom sweep three-dimensional wedges, as shown in FIG. 4. Each three-dimensional wedge is 50° by 90° in volume as depicted in FIG. 5. At 50 feet from the measurement pods, the valid sensing region 64 will have a planer size of 45 feet by 45 feet. When one or more detector modules of the array 26 carried by the target object 24 are simultaneously hit by the scanning lasers from both measurement pods 32, 34, the angles of the laser planes from each measurement pod to the ring-shaped detector array 26 can be determined by the control station 30 using an algebraic transform which generates a closed-form solution based on direction information 86 (FIG. 7) transmitted by each measurement pod 32, 34 of the laser scanning apparatus 22 and detection signals 84 transmitted by the detector array 26. A hit occurs when one or more detector modules of the array 26 are located within the 50° by 50° valid sensing region 64 (FIG. 5).

Each measurement pod 52 (FIG. 3) includes a first motion controller 104 with a pan rotary table and a second motion controller 106 with a tilt rotary table which are operable to control panning and tilting of the box 54 in response to commands from the laser scanning controller 80 at the control station 30. The pan and tilt rotary tables are used to maintain the target object 24 in the center of the valid sensing region 64 (FIG. 5). The box 54 is controlled to continuously attempt to center the array of detectors 26 on the target object 24 within the 50° degree by 50° degree valid sensing area 64.

The angle of the high-precision rotating mirror 96 (FIG. 8) at a particular instant can be determined with great accuracy and repeatability by the control station 30. The high-precision with which the angular position of the rotatable mirror can be determined enables the position and orientation of the moving target object to be determined to a precision of less than 0.25 inches and 50 arcseconds at an update rate of 100 Hz.

If one or more optical detectors of the detector array 26 mounted on the moving target vehicle 24 receive simultaneous laser hits from both lasers of each measurement pod 32, 34 (FIG. 2), then the bank of bandpass filters 102 (FIG. 9) coupled to the output of each optical sensor 98 operates to demodulate the resultant signal. A bank of trigger components 108 is coupled to the output of the bank of bandpass filters 102, with a trigger component for each filter unit. The bank of trigger components 108 comprises a trigger component coupled to the output of each filter corresponding to a unique signature modulating signal frequency used to modulate the laser planes. When the filter output from a bandpass filter of the filter bank 102 generates a filter signal, its associated trigger component "goes high" indicating detected radiation at the bandpass frequency of the bandpass filter. The trigger components output detection signals 84, which are passed to the digital controller 76 (FIG. 7).

In the digital controller 76, a bank of counters 110 is coupled to the bank of trigger components 108 (FIG. 9). An associated counter component in the bank of counter components 110 (FIG. 7) for each of the unique modulating signal frequency bands is coupled to each respective trigger component of the bank of trigger components 108. When a trigger component output goes high, it triggers its associated counter component.

A synchronous master oscillator 112 in the digital controller 76 (FIG. 7) is coupled to the input of each of the bank of counters 110, along with a trigger component output.

Using the master oscillator 112, the precise time at which the lasers hit the array 26 of detectors can be recorded. The detection signals 84 from the bank of trigger components 108 are synchronously time-stamped using the master oscillator 112. The master oscillator 112 and the bank of counters 110 synchronously generate time-stamp signals 114. The time-stamp signals 114 identify times and laser scanner subsystems for qualified hits, and are passed to the VME-based control processor 78.

The motorized motion controllers 104, 106 (FIG. 3) are capable of articulating the box 54 in order to follow and center the moving target object 24 in the valid sensing region 64 of the laser planes 60, 62. Encoder plates within the motion controllers provide for continuous control and recordation of the panning and tilting orientation of the box 54. The laser scanning apparatus 22 generates direction information based on (a) the pan rotary table and tilt rotary table and (b) synchronization signals from the master oscillator 112. The direction information 86 (FIG. 7) is used to determine the solid angles subtended by each orthogonal laser of each measurement pod 32, 34. The direction information 86 and detection signals 84 are processed and correlated to a direction for each of the laser planes by the control station 30.

Calibration of the position and orientation tracking system involves modeling the geometric relationships existing between the components of the system. Calibrating the position and orientation tracking system includes aligning the two measurement pods in the dome 40 of the silo 42; the dimensions (and other variables) of which vary with installation. In-silo alignment involves placing infrared ("IR") registration diodes around the perimeter of the silo 42. Each measurement pod 52 (FIG. 3) is operated, panning and tilting the box 54 with two operating laser scanner subsystems 56, 58 in order to determine the locations of the IR registration diodes with respect to each box. The positioned IR registration diodes form a frame of reference for subsequent operational measurements. The geometric relationship between the IR registration diodes reference frame and the two measurement pods is determined by panning and tilting each box of each measurement pod to sight on each IR registration diode and then operating the control station 30 to solve for the location of the measurement pod.

Figure 10:
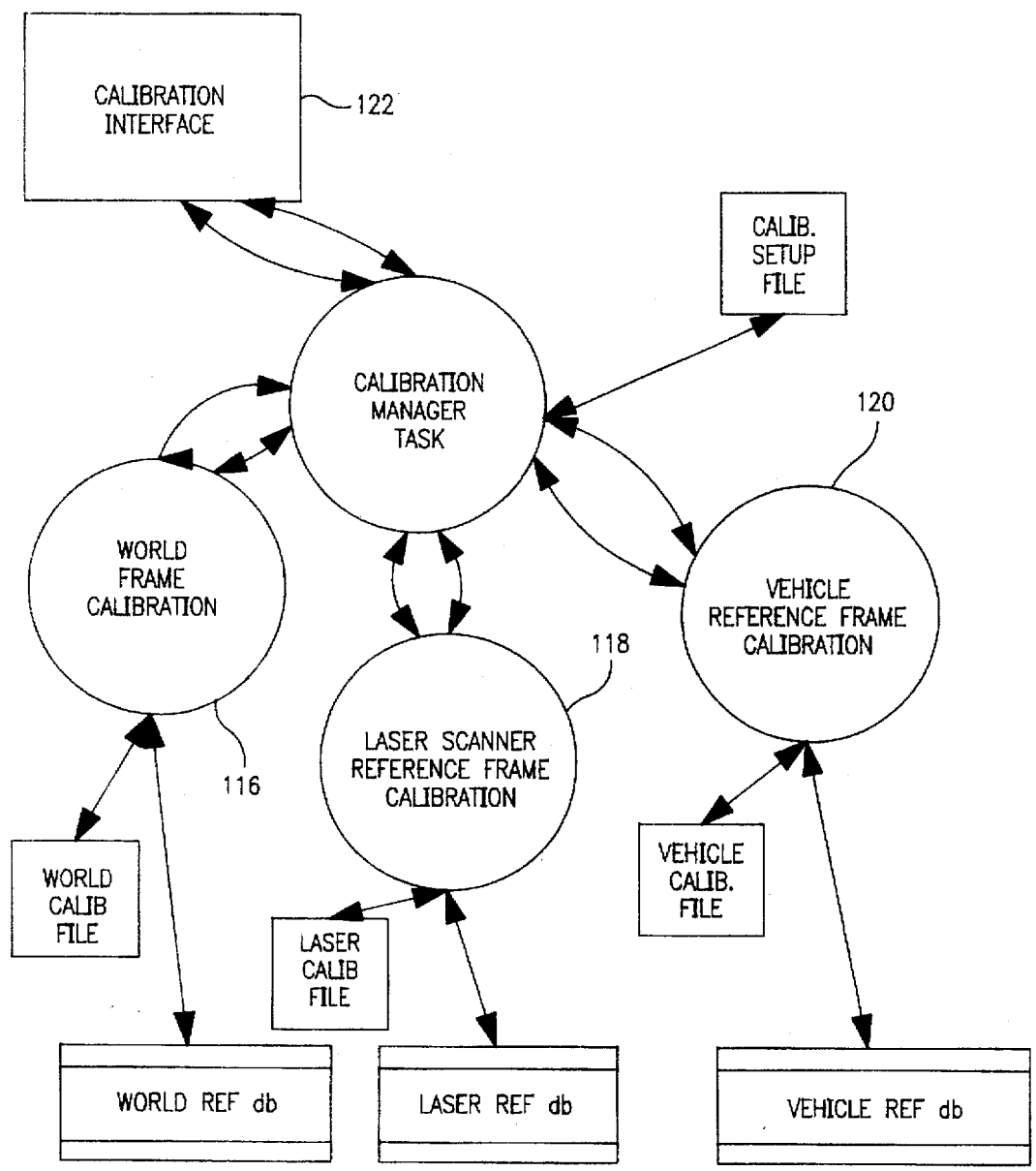
FIG. 10 is a schematic view for describing calibration of the position and orientation tracking system according to an embodiment of the invention.

Three reference frames 116, 118, 120 are determined during calibration, as shown in FIG. 10. A calibration interface 122 allows an operator to interactively operate the control station 30 calibration routines to determine the three reference frame 116, 118, 120 parameters. The vehicle reference frame 120 parameters contain the geometric locations of the eight detector modules of the array 26 mounted on the vehicle 24 and also contain the dimensions of the vehicle. The laser scanner box reference frame 118 and the world reference frame 116 are determined from known silo dimensions and measurement pod dimensions, as well as empirical data collected and stored by the control station 30 during calibration.

IR registration diodes are mounted at the top of the silo dome 40 (FIG. 2) and are used to determine the world reference frame 116. The laser scanner subsystems are operated to determine and store the unit vectors from each laser scanner subsystem to each IR registration diode at the top of the dome. The detector modules are installed and positioned such that the relationship of each detector module to the world reference frame 116 is known. The unit vectors from the laser scanner subsystems are combined to determine the locations of each laser scanner box reference frame 118 relative to the world reference frame 116. The world 116, laser scanner box 118, and vehicle 120 frames of reference are stored to be utilized by the control station in monitoring operation to determine the position and orientation of the target robot vehicle carrying an array of detector modules.

Figure 11:
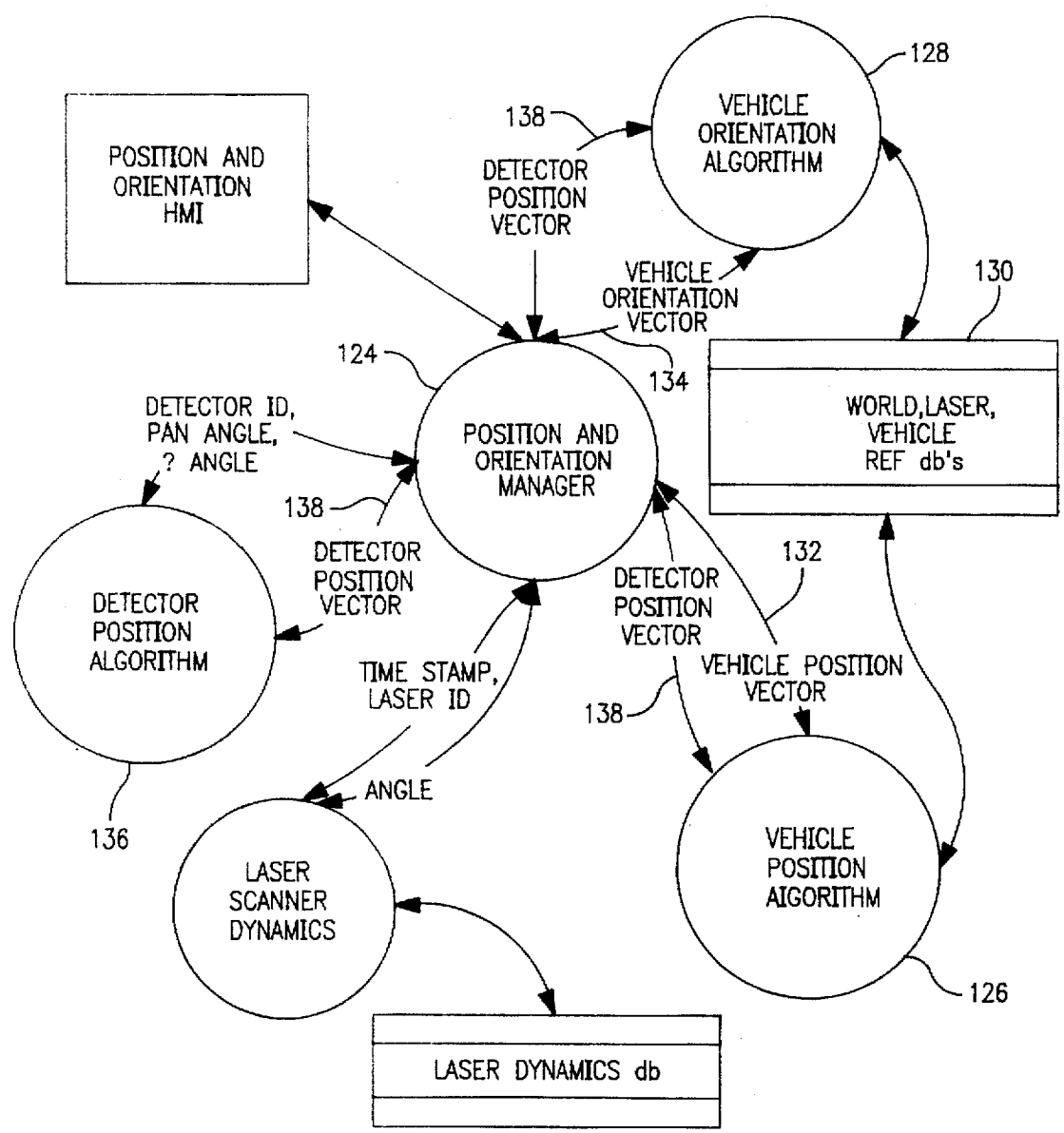
FIG. 11 is a schematic view for describing a position and orientation control routine operated by the control station according to an embodiment of the invention.

Referring to FIG. 11, the control station operates a position and orientation control routine 124 to monitor the position 126 and orientation 128 of the target vehicle. The position and orientation control routine 124 utilizes the world, laser scanner box, and vehicle frames of reference 130 to interpret the direction information 86 (FIG. 7) provided by the laser scanning apparatus.

Figure 12:
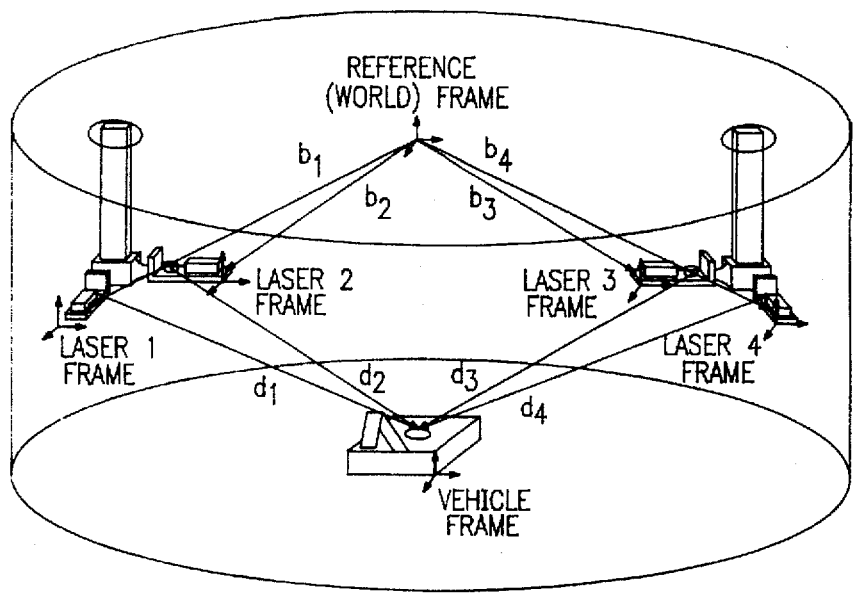
FIGS. 12 and 13 are schematic views for describing a vector addition routine for determining the location of the detector array depicted in FIG. 6.
Figure 13:
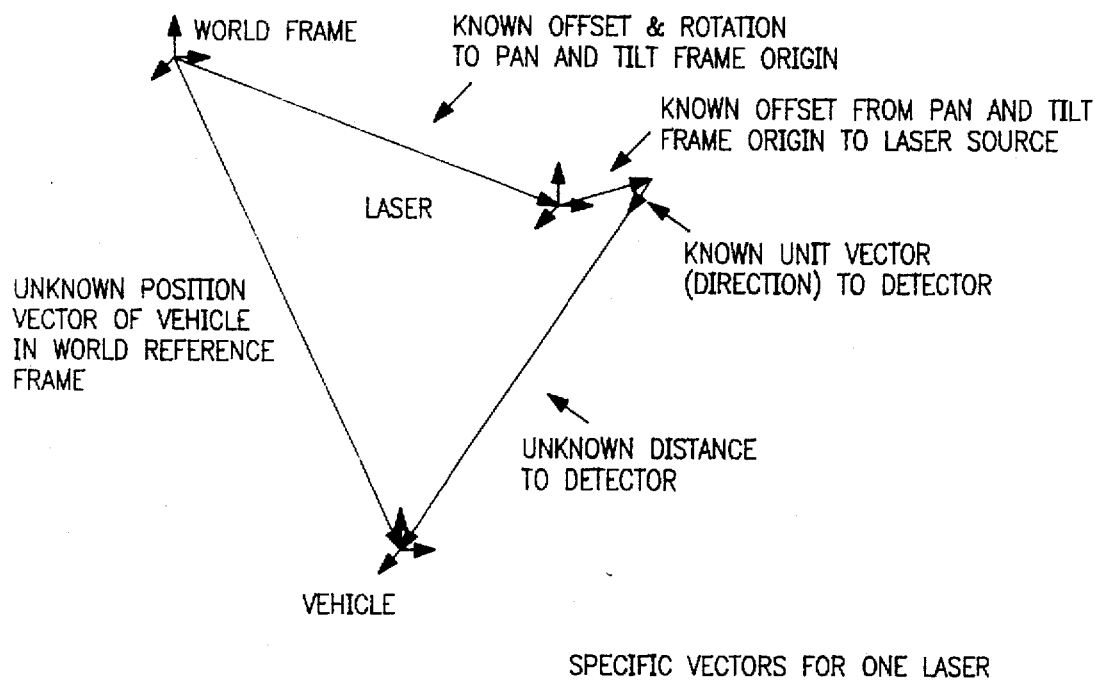

The control station continuously operates to generate vehicle position and orientation vector signals 132, 134 for the target vehicle. The position and orientation control routine 124 continuously stores the locations of the discrete detector modules with respect to the vehicle frame of reference 120 (FIG. 10) and the currently measured locations of the detector modules with respect to the world frame of reference 116. The position and orientation control routine 124 continuously determines 136 the location of the array of detector modules carried by the target vehicle through solving a low-order eigenvalue vector addition problem using quaternion algebra, as shown in FIGS. 12 and 13.

Figure 14:
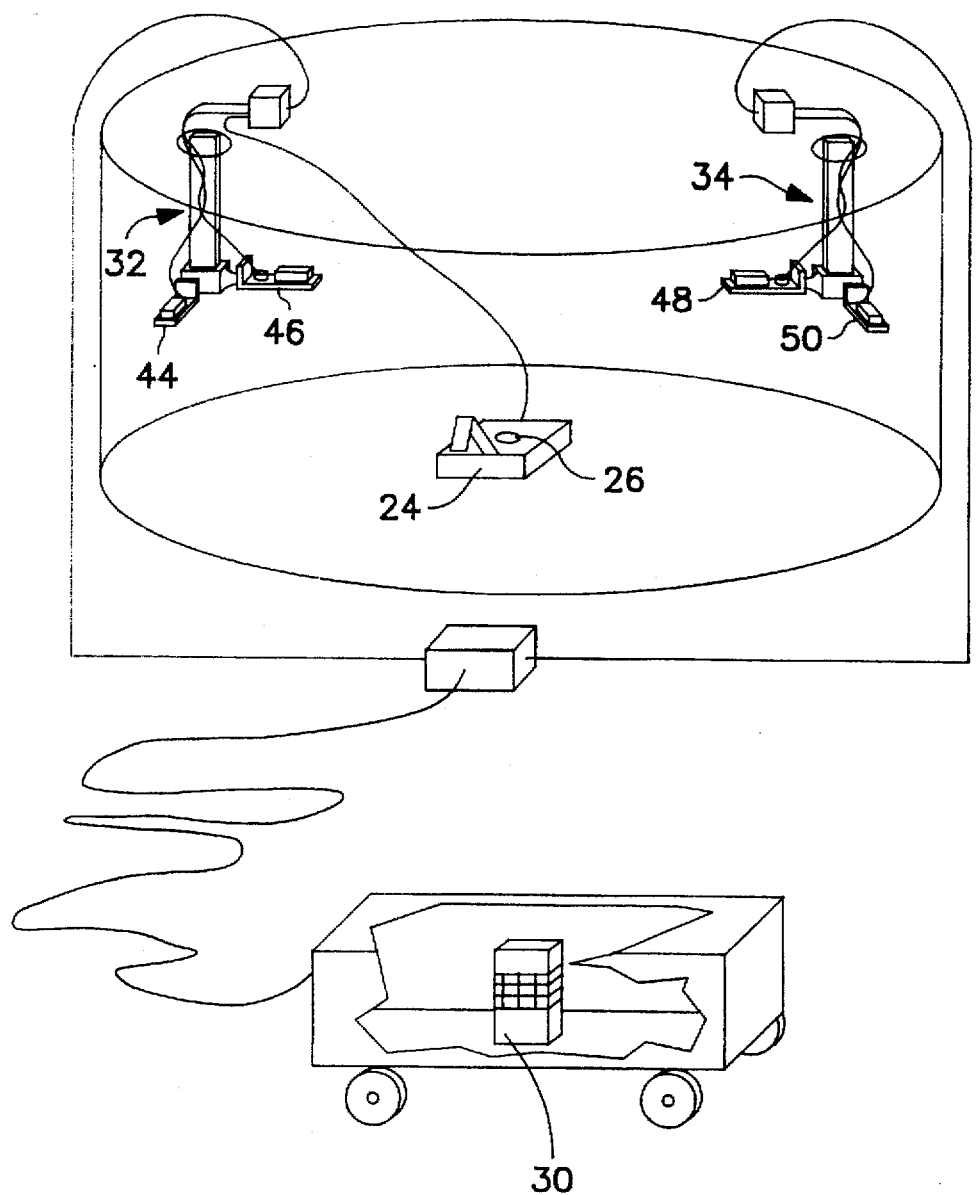
FIG. 14 is a perspective view of the position and orientation tracking system deployed in a waste storage tank and operated from a remote trailer.

Referring to FIG. 14, the control station 30 is coupled to the two measurement pods 32, 34 of the laser scanning apparatus and to the detector array 26 on the target vehicle 24. The digital controller at the control station 30 records the time of hits to the detector modules and passes time-stamp signals to the VME-based control processor of the control station 30. The control processor determines the angles at the time of the hit from each of the scanning laser subsystems causing the hit.

The control station 30 employs the position and orientation control routine 124 (FIG. 11) to determine the present detector module position vectors 138 relative to the world reference frame 116 (FIG. 10) based on the laser scanner subsystem angles and the identified detector module which indicated scoring of the hit. The control station 30 processes the detector position vectors 138 to determine the target vehicle position 132 and orientation 134 vectors. The target vehicle position and orientation vectors 132, 134 are recorded in memory for continued use by the control station. The control station generates a vehicle position and orientation signal based on the vehicle position 132 and orientation 134 vectors which can be translated into text form for use by the vehicle manager at the operating site.

The position and orientation tracking system taught herein can be used to track any dynamic system. It is contemplated that the position and orientation tracking system could be embodied to track a remote robotically-controlled vehicle or a long-reach flexible articulated manipulator. A position and orientation tracking system according to the present invention could be used in any environment where a target object moves over a large work space to accomplish a task. The tracking system could also be used for deploying, repairing, or replacing satellites or other objects by robotic manipulation from a space shuttle or for determining the position of parts inside a super collider or inside fusion test reactors. The high update rate of the position and orientation tracking system allows the position and orientation of a moving target object to be determined to a high resolution.

From the foregoing, it will be appreciated that the combination of high-resolution laser scanners and detector modules, and a robust position and orientation control system enables an accurate determination of the position and orientation of a moving vehicle or other target object and improves long-distance measuring of the position and orientation of a target object.

While advantageous embodiments have been chosen to illustrate the invention, it will be understood by those skilled in the art that various changes and modifications can be made therein without departing from the scope of the invention as defined in the appended claims.

What is claimed is:

1. A system for tracking the position and orientation of a moving target object, comprising:
   (A) laser scanning means for scanning the moving target object and generating direction information;
   (B) detection means carried by the moving target object for detecting scanning of the moving target object by the laser scanning means and generating a detection signal; and
   (C) control means for controlling the laser scanning means based on the direction information and the detection signal while the target object is moving.

2. A system according to claim 1, wherein:
   the control means operate to record scanning of the moving target object by the laser scanning means.

3. A system according to claim 1, wherein:
   the control means are communicatively coupled to the laser scanning means and to the detection means.

4. A system according to claim 1, wherein the control means comprise:
   means for correlating the direction information generated by the laser scanning means and the detection signal generated by the detection means to determine the position and orientation of the moving target object while the target object is moving.

5. A system according to claim 1, wherein the laser scanning means comprise:
   a first measurement pod;
   a second measurement pod; and
   the first measurement pod and the second measurement pod are each communicatively coupled to the control means.

6. A system according to claim 5, wherein the first measurement pod and the second measurement pod each comprise:
   a first laser scanner subsystem for generating a first line laser; and
   a second laser scanner subsystem for generating a second line laser which is directed orthogonally to the first line laser.

7. A system according to claim 5, wherein the first measurement pod and the second measurement pod each comprise:
   a box which is capable of being articulated about two orthogonal axes.

8. A system according to claim 7, wherein the box comprises:
   a first laser scanner subsystem, and
   a second laser scanner subsystem.

9. A system according to claim 8, wherein the first laser scanner subsystem and the second laser scanner subsystem each comprise:
   a laser source and a multi-faceted polygonal mirror for generating a line laser.

10. A system according to claim 9, wherein the first laser scanner subsystem and the second laser scanner subsystem each further comprise:

a laser driver coupled to the laser source.

11. A system according to claim 1, wherein the detection means comprise:

an array of detector modules.

12. A system according to claim 11, wherein each detector module comprises:

an infrared photodiode and an optical filter.

13. A system according to claim 1, wherein:

the control means are communicatively coupled to both the laser scanning means and the detection means, and include a VME-based control processor and a digital controller.

14. A system according to claim 11, wherein the detection means further comprise:

means for identifying one or more detector modules of the array of detector modules that sensed an impinging laser.

15. A system according to claim 14, wherein the detection means further comprise:

means for determining a frequency of the impinging laser.

16. A system according to claim 15, wherein:

the detection signal comprises data which represent the frequency of the impinging laser.

17. A system according to claim 1, wherein the detection means comprise:

an array of detector modules for detecting a scanning laser, each detector module of the array of detector modules comprising an infrared photodiode and optical filter for generating a photodiode signal responsive to the scanning laser; and a bank of bandpass filters coupled to each photodiode for filtering the photodiode signal, the bank of bandpass filters is operative to generate a filter signal which identifies a frequency of the scanning laser.

18. A system according to claim 17, wherein the control means comprise:

a master oscillator which can be operated synchronously with the bank of bandpass filters for recording the time that the filter signal is generated.

19. A method for tracking the position and orientation of a moving target object, comprising the steps of:

(A) scanning the moving target object with three or more lasers;

(B) detecting scanning of the moving target object with the three or more lasers;

(C) determining the direction of each of the three or more lasers to the moving target object;

(D) determining the time that each of the three or more lasers scanned the moving target object;

(E) determining the position and orientation of the moving target object based on:

(i) the direction of each of the three or more lasers to the moving target object and (ii) the time that each of the three or more lasers scanned the moving target object; and (F) following the moving target object with the three or more lasers.

20. A method according to claim 19, wherein step (A) comprises the steps:

providing a first laser scanner subsystem and a second laser scanner subsystem;

radiating a first laser from the first laser scanner subsystem; and radiating a second laser from the second laser scanner subsystem.

21. A method according to claim 20, wherein step (A) further comprises the steps:

providing a third laser scanner subsystem and a fourth laser scanner subsystem;

radiating a third laser from the third laser scanner subsystem; and radiating a fourth laser from the fourth laser scanner subsystem.

22. A method according to claim 21, wherein step (D) comprises the steps:

determining three or more times responsive to each of the first laser, the second laser, the third laser, and the fourth laser scanning the moving target object; and generating a time-stamp signal for each of the three or more times.

23. A method according to claim 22, wherein step (E) comprises the step:

measuring the position and orientation of the moving target object based on the three or more time-stamp signals.

\* \* \* \* \*